United States Patent
Haunschild et al.

(10) Patent No.: US 6,451,408 B1
(45) Date of Patent: *Sep. 17, 2002

(54) RETROREFLECTIVE ARTICLE

(75) Inventors: Dale H. Haunschild, Hudson, WI (US); John L. Ethen, Oakdale, MN (US); Mark D. Zender, Mahtomedi, MN (US); Robert A. Haenggi, Woodbury, MN (US); Larry K. Stump, Hudson, WI (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/285,349

(22) Filed: Apr. 2, 1999

Related U.S. Application Data

(63) Continuation-in-part of application No. 08/672,143, filed on Jun. 27, 1996, now abandoned.
(60) Provisional application No. 60/000,708, filed on Jun. 29, 1995.

(51) Int. Cl.[7] .................................................. G02B 5/12
(52) U.S. Cl. ........................ 428/143; 428/143; 428/325; 428/149; 428/166; 428/156; 428/161; 428/162; 428/163; 428/220; 428/343; 359/529; 359/531; 359/532; 359/533; 359/534; 359/537; 359/536; 359/542; 427/163.4; 404/14
(58) Field of Search .................................. 428/143, 325, 428/149, 166, 141, 156, 161, 162, 163, 220, 343; 359/529, 531, 532, 533, 534, 537, 536, 542; 404/14; 427/163.4

(56) References Cited

U.S. PATENT DOCUMENTS

| | | | | |
|---|---|---|---|---|
| 2,294,930 A | * | 9/1942 | Palmquist | 359/538 |
| 2,897,733 A | | 8/1959 | Shuger | 94/1.5 |
| 2,948,191 A | * | 8/1960 | Hodgson, Jr. et al. | 359/538 |
| 3,311,441 A | * | 3/1967 | Gill, Jr. | 359/538 |
| 3,746,425 A | * | 7/1973 | Eigenmann | 350/109 |

(List continued on next page.)

FOREIGN PATENT DOCUMENTS

| | | | | |
|---|---|---|---|---|
| CH | 66 5665 | * | 5/1988 | |
| DE | 9401987.8 | | 4/1994 | |
| DE | 44334659 | | 4/1995 | |
| EP | 385 746 B1 | | 9/1990 | E01F/9/04 |
| EP | 835 349 | | 4/1998 | E01F/9/04 |
| WO | WO93/21388 | | 10/1993 | |

(List continued on next page.)

OTHER PUBLICATIONS

ASTM E97–77.
ASTM E303–93.

*Primary Examiner*—William P. Watkins, III

(57) ABSTRACT

A retroreflective article that exhibits suitable retroreflective luminance under dry and dynamic wet conditions. The article includes an enclosed-lens retroreflective sheeting that, under dry conditions, exhibits a coefficient of retroreflective luminance of about 40 (millicandela/m$^2$)/lux as measured by ASTM D 4061-94 and, under dynamic wet conditions the sheeting increases in coefficient of retroreflective luminance. The article further includes a plurality of retroreflective elements partially embedded in a light transmissible bonding layer on the front, reflective surface of the retroreflective sheeting.

33 Claims, 1 Drawing Sheet

U.S. PATENT DOCUMENTS

| | | | | |
|---|---|---|---|---|
| 3,920,346 A | | 11/1975 | Wyckoff | 404/14 |
| 4,025,159 A | | 5/1977 | McGrath | 350/105 |
| 4,025,195 A | | 5/1977 | Ebersole et al. | 356/71 |
| 4,040,760 A | | 8/1977 | Wyckoff | 404/14 |
| 4,072,403 A | | 2/1978 | Eigenmann | 350/103 |
| 4,145,112 A | | 3/1979 | Crone et al. | 350/103 |
| 4,236,788 A | | 12/1980 | Wyckoff | 350/97 |
| 4,411,553 A | * | 10/1983 | Eigenmann | 404/16 |
| 4,505,967 A | | 3/1985 | Bailey | 428/164 |
| 4,564,556 A | | 1/1986 | Lange | 428/325 |
| 4,664,966 A | | 5/1987 | Bailey et al. | 428/203 |
| 4,681,401 A | | 7/1987 | Wyckoff | 350/105 |
| 4,712,867 A | | 12/1987 | Malek | 350/103 |
| 4,712,868 A | * | 12/1987 | Teng et al. | 350/105 |
| 4,751,140 A | * | 6/1988 | Ishihara | 428/324 |
| 4,875,798 A | | 10/1989 | May | 404/12 |
| 4,921,754 A | * | 5/1990 | Ishihara | 428/325 |
| 5,127,973 A | | 7/1992 | Sengupta et al. | 156/60 |
| 5,257,491 A | | 11/1993 | Rouyer et al. | 53/428 |
| 5,268,789 A | | 12/1993 | Bradshaw | 359/534 |
| 5,277,513 A | | 1/1994 | Flanagan et al. | 404/16 |
| 5,340,231 A | | 8/1994 | Steere et al. | 404/14 |
| 5,450,235 A | | 9/1995 | Smith et al. | 359/529 |
| 5,539,033 A | | 7/1996 | Bredahl et al. | 525/270 |
| 5,550,175 A | | 8/1996 | Bredahl et al. | 523/348 |
| 5,605,761 A | | 2/1997 | Burns et al. | 428/412 |
| 5,677,050 A | | 10/1997 | Bilkadi et al. | 428/331 |
| 5,691,846 A | | 11/1997 | Benson, Jr. et al. | 359/530 |
| 5,706,132 A | | 1/1998 | Nestegard et al. | 359/529 |
| 5,774,265 A | | 6/1998 | Mathers et al. | 359/539 |
| 5,880,885 A | * | 3/1999 | Bailey et al. | 359/529 |

FOREIGN PATENT DOCUMENTS

| | | | |
|---|---|---|---|
| WO | WO 97/01677 | 1/1997 | E01F/9/04 |
| WO | WO97/01679 | 1/1997 | |
| WO | WO 99/04096 | 1/1999 | E01F/9/04 |
| WO | WO 99/04099 | 1/1999 | E01F/9/08 |

* cited by examiner

RETROREFLECTIVE ARTICLE

CROSS-REFERENCE TO RELATED APPLICATIONS

This application is a continuation-in-part of U.S. patent application Ser. No. 08/672,143, filed Jun. 27, 1996, abandoned which claims priority from U.S. Provisional Application Serial No. 60/000,708, filed Jun. 29, 1995.

TECHNICAL FIELD

The present invention relates to retroreflective articles that exhibit good retroreflective brightness under wet and dry conditions and good retroreflective brightness at high entrance angles.

BACKGROUND

Pavement markings, such as those on the centerline and edgeline of a roadway, are important in order to provide visual guidance for motor vehicle drivers. Pavement marking materials are used as traffic control markings for a variety of uses, such as short distance lane striping, stop bars, and pedestrian pavement markings at intersections and long line lane markings, etc. on roadways. A common form of pavement marking material is adhesive-backed tape that is applied to the roadway surface in desired location and length; the top surface of the tape having selected color and typically retroreflective characteristics.

Currently, many flat pavement markings typically rely on an exposed-lens optical system comprising transparent microspheres partially embedded in a binder layer containing reflective pigment particles such as titanium dioxide ($TiO_2$) or lead chromate ($PbCrO_4$) as the retroreflector mechanism. In use, light from the headlamp of a vehicle enters the microsphere and is refracted to fall on the reflective pigment. Some portion of the light is returned generally along the original entrance path in the direction of the vehicle so as to be visible to the driver. The amount of refraction and the amount of light gathering of these microspheres is dependent in part upon maintaining a low index of refraction air interface on the exposed portion of the microsphere. During rainy periods, the microspheres become wetted with water which reduces their light refracting ability resulting in much reduced retroreflective performance.

It is also known to use enclosed-lens retroreflective structures on pavement markings. See, e.g., U.S. Pat. No. 4,875,798 (May) and U.S. Pat. No. 5,340,231 (Steere et al.). Enclosed-lens retroreflective sheetings with flat cover films (also sometimes referred to as top films, top sheets, cover sheets, etc.) have been constructed as a means for providing effective retroreflection under wet conditions. See, e.g., U.S. Pat. No. 4,025,159 (McGrath) which discloses encapsulated-lens retroreflective articles and U.S. Pat. No. 4,505,967 (Bailey) and U.S. Pat. No. 4,664,966 (Bailey et al.) which disclose embedded-lens retroreflective articles.

Currently available low profile pavement markings provide effective retroreflective response for only a narrower range of entrance angles than is sometimes desired. For example, flat pavement markings, relying on microspheres partially embedded in layers containing diffuse pigments as described above, are most easily seen at distances of approximately 80 meters and less. At distances greater than this, retroreflective brightness declines due in part to the relatively larger entrance angles of the incident light and in part to inherently limited retroreflective brightness. In addition to generally low retroreflectivity at high incidence angles, flat pavement markings are particularly difficult to see under rainy conditions for the reasons discussed above. Raised pavement markers typically have better wet reflectivity because the rain will run off the raised portions and they sometimes use reflective systems that are inherently retroreflective when wet. However, snow removal is frequently a problem on roads bearing raised pavement markers, as the snowplows have a tendency to catch on the raised protrusions and dislodge the markers from the road surface. Also, raised pavement markers mounted as spot delineators provide relatively poor daytime road delineation and thus commonly need to be augmented with continuous painted or tape line markings.

To expand the effective entrance angle range of a pavement marking material, combination of a light directing means with an enclosed-lens retroreflector has been proposed. For example, U.S. Pat. No. 4,145,112 (Crone) discloses an article comprising an underlying base retroreflective layer and a light directing layer comprised of a longitudinally-extending series of short transparent projections. U.S. Pat. No. 4,236,788 (Wyckoff) discloses a related type of pavement marker strip wherein the two sides of the transverse prisms are adjusted to provide for downward internal reflection into the base sheet from one side and refraction to the space between successive prisms into the base sheet from the other side. U.S. Pat. No. 3,920,346 (Wyckoff) discloses a saw-tooth-like marker strip comprising protrusions with curved edges and having upwardly disposed retroreflective members embedded therein.

U.S. Pat. No. 4,072,403 (Eigenmann) discloses a retroreflective assembly that is particularly useful for situations in which retroreflection is required in rainy conditions. The assembly disclosed therein comprises a transparent globule with a layer of transparent microspheres on certain portions of the globule and a reflective layer disposed behind the microspheres. The retroreflective assemblies, sometimes referred to as "globule/microsphere retroreflective assemblies", are positioned on the top surface of a pavement marking where they provide effective retroreflection of light at high incidence angles. U.S. Pat. No. 5,268,789 (Bradshaw) discloses an improved retroreflective assembly of this type and an improved method for making such an assembly.

EP Patent publication 385746 B1 (Kobayashi et al.) discloses a high-brightness all-weather pavement marking. The marking includes glass microspheres of relatively large diameter partially embedded in a first transparent resin layer that serves to hold the microspheres. The pavement marking further includes glass microspheres of relatively small diameter that are buried in a second transparent resin layer. In the lower portion of the second transparent resin, behind the rear of the small glass microspheres, lies a reflecting layer. In use, incident light strikes the large glass microspheres, travels through the second transparent resin layer, strikes the small glass microspheres, is reflected by the reflecting layer, and returns in the direction from which it came, i.e., through the small glass microspheres, through the second transparent resin layer, and finally through the large glass microspheres. The small glass microspheres and large glass microspheres work together to retroreflect incident light. It is also described that the large glass microspheres, being partially exposed in air, can receive a large amount of incident light, even if such light is at a large incidence angle. It is further described that the pavement marking is useful in rainy conditions.

There still exists a need for a low profile retroreflective article that exhibits good retroreflective characteristics under dry and wet conditions, preferably at high incidence angles in both daytime and nighttime, possesses suitable skid resistance, and is suitably durable.

SUMMARY OF INVENTION

Applicants have found that an article having a combination of exposed-lens retroreflective elements and enclosed-lens retroreflective sheeting provides retroreflectivity under dry and dynamic wet conditions at very high entrance angles (e.g., 80° or more, preferably 85° or more). The inventive articles are well suited for use on vertical and horizontal surfaces, but are particularly beneficial for use on horizontal surfaces, such as roadway pavement. The invention also provides a method for making such materials. Much of the following description is made with specific reference to embodiments of the invention to be used as pavement marking articles.

One aspect of the present invention provides a retroreflective article including an enclosed-lens retroreflective sheeting having a first surface and a second surface, wherein, under dry conditions, the sheeting exhibits a coefficient of retroreflective luminance at a simulated 30 meter viewing geometry as measured by ASTM D 4061-94 of about 40 (millicandela/m$^2$)/lux, and under dynamic wet conditions, the sheeting exhibits an increase in coefficient of retroreflective luminance; a light transmissible bonding layer disposed on the first surface of the retroreflective sheeting; and a plurality of retroreflective elements partially embedded in the bonding layer.

In accordance with the present invention, the enclosed-lens retroreflective sheeting is preferably selected from the group consisting of microsphere type sheeting and cube-corner type sheeting. The retroreflective sheeting can be selected from the group consisting of an embedded-lens retroreflective sheeting and an encapsulated-lens retroreflective sheeting.

Preferably, the retroreflective elements are substantially spherical in shape, ranging in a size from about 0.5 mm to about 1.2 mm. In one embodiment, the retroreflective elements cover from about 0.4% to about 6.6% of a surface area of the retroreflective article. Preferably, the microspheres used in the retroreflective elements have a refractive index of about 1.50 to about 2.60. The retroreflective elements preferably comprise ceramic optical elements partially embedded in an opacified glass core. The ceramic optical elements can comprise an amorphous phase, a crystalline phase, and a combination thereof. Preferably, the core comprises at least two phases, one phase in a size range from about 0.05 micrometers to about 1.0 micrometers. The core can include at least two phases, wherein one phase has a refractive index value of at least 0.4 greater than the second phase. Preferably, the opacified glass comprises an opacifier having a refractive index of about 1.9 to about 2.7.

The retroreflective article in accordance with the present invention may further include a layer of adhesive on the second surface of the retroreflective article. The article may also include at least one of a conformance layer and a scrim layer on the second surface of the retroreflective article.

Preferably, the light transmissible bonding layer is formed from a polyurethane composition. The retroreflective article may also include a top film disposed on a surface of the bonding layer opposite the retroreflective sheeting or disposed directly on the retroreflective sheeting's first surface. Preferably, the enclosed-lens retroreflective sheeting includes a layer of microspheres embedded in a light transmissible bonding composition and a specular layer in optical association with the microspheres, wherein a spacing layer separates the microspheres from the specular layer.

Another aspect of the present invention provides a method for making a retroreflective article including providing a retroreflective sheeting comprising a first surface and a second surface; applying a bonding composition to the first surface of the retroreflective sheeting, wherein the bonding composition is capable of forming a light transmissible bonding layer; and applying a plurality of retroreflective elements to the bonding composition so that the retroreflective elements are partially embedded in the bonding layer.

DEFINITIONS

As used herein,

"dry" means that no additional moisture is added to any surface of a retroreflective article such that the only moisture in contact with the article is ambient moisture.

"dynamic," when referring to wet conditions, means physical detectable movement of water is present on at least a portion of a surface of the retroreflective article. The physical movement of the water can be one of rain drops falling on the retroreflective article, wind blowing across the water surface on the retroreflective article, water draining off the surface of the retroreflective article, and the like, as well as a combination thereof. This dynamic condition is to be distinguished from a "static-flooded" water condition that is typified by a glass- or mirror-like surface of the water, i.e., no physical movement of the water can be detected where the retroreflective article is substantially submerged in the water.

"coefficient of retroreflective luminance (herein "$R_L$")" means the ratio of the luminance, "L," of a projected surface to the normal illuminance at the surface on a plane normal to the incident light, expressed as millicandelas per square meter per lux ((mcd/m$^2$)/lux), as described in ASTM E 808-94.

"enclosed-lens retroreflective sheeting" comprises a layer of optical elements, whether microspheres (commonly referred to as "beads") or cube-corner elements, having at least one polymer in contact with the optical elements such that they are not exposed to ambient conditions. Such sheeting includes embedded-lens and encapsulated-lens retroreflective sheeting.

"high entrance angle," when referring to incident light, means light rays of approximately greater than 80° from vertical, preferably greater than 85°, and most preferably between 86° and 90°, such as may be generated by headlights on vehicles illuminating a pavement surface.

"light transmissible" means that a particular layer or medium transmits light from about 400 to about 700 nanometers wavelength (i.e., in the visible spectrum) of the electromagnetic spectrum.

BRIEF DESCRIPTION OF DRAWINGS

The invention will be further explained with reference to the drawing, wherein.

Figure 1:
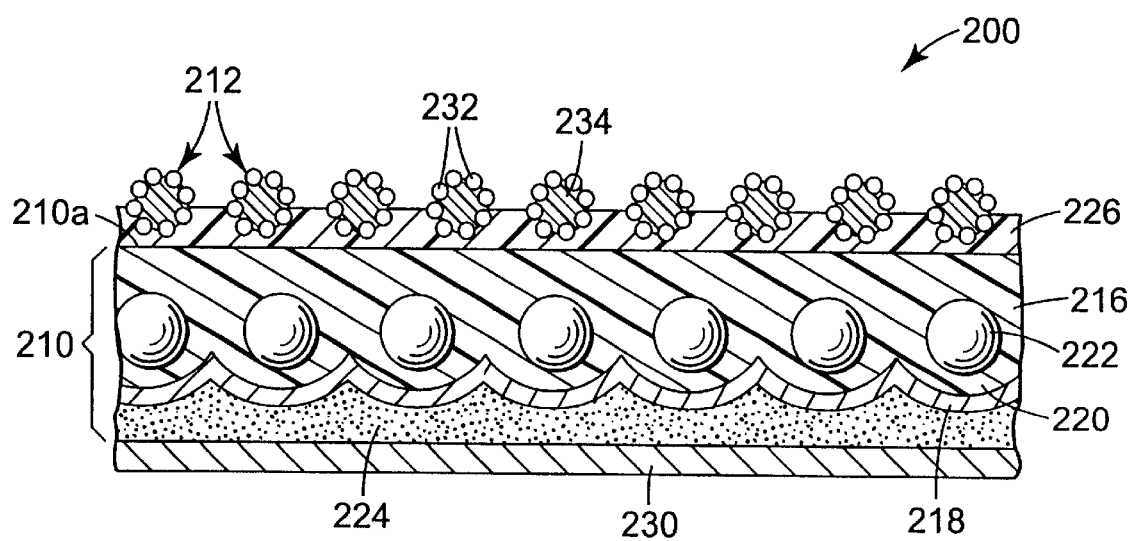
FIG. 1 is a plan view of a portion of an illustrative pavement marking article 200 of the invention.

The figure is idealized, not to scale and, intended to be merely illustrative and non-limiting.

DETAILED DESCRIPTION OF ILLUSTRATIVE EMBODIMENTS

Articles of the invention typically comprise a retroreflective sheeting, a bonding layer, a plurality of retroreflective elements, optional backing materials, and optional adhesive layer. In general, the inventive article preferably includes a plurality of retroreflective elements at least partially embedded in a bonding layer disposed on the front surface of an enclosed-lens sheeting.

As shown in FIG. 1, a retroreflective article 200 in accordance with the present invention includes a plurality of retroreflective elements 212 partially embedded in a light transmissible bonding layer 226 on a front surface 210a of an enclosed-lens retroreflective sheeting. The sheeting's front surface is the side that is capable of retroreflecting incident light. Preferably, the sheeting is a microsphere-based embedded-lens retroreflective sheeting 210 that includes a layer of microspheres 222, preferably as a monolayer, embedded within a transparent binder layer 216 over a reflective layer 218 in optical association with the microspheres 222. By "optical association," it is meant that the specular coating layer lies at a distance where incident light entering the microspheres will be focused on the specular coating. This distance can be referred to as a spacing layer 220. Preferably, the transparent binder 216 is of the same material as the spacing layer 220, although different materials may be used. The sheeting 210 further includes an adhesive layer 224 and an optical conformance layer 230. The microspheres 222 act as optical elements by directing incident light to the reflective layer and then redirect the light. The microspheres 222 are part of an enclosed-lens system, whose primary function is to provide retroreflectivity under dynamic wet conditions.

The retroreflective elements 212 comprise optical elements 232 and a core 234. The optical elements 232 are part of an exposed-lens optical system, whose primary function is to provide retroreflectivity under dry conditions.

A binder used in the present invention (depicted as binder 216 in FIG. 1) is preferably a light transmissible polymeric matrix. It may be single layer or multilayer, e.g., further comprising a top film lying on the front surface 210a. Many useful polymeric materials can be used and are well known. Illustrative examples of useful polymer binder layers include thermoset materials and thermoplastic materials. Suitable polymeric materials include, but are not limited to, urethanes, epoxies, alkyls, acrylics, and acid olefin copolymers (e.g., ethylene methacrylic acid, polyvinyl chloride-polyvinyl acetate copolymers, and the like). Representative examples of other suitable binder materials include polyvinyl butyral, polyester resins, alkyd resins, acrylic resins, and the like, and a combination thereof. Such materials can be heat-activated or chemically-activated adhesives. One preferred binder material is polyvinyl butyral. Aliphatic polyurethanes are preferred materials for top films because they are clear, resistant to dirt build-up, flexible enough to conform to the road surface, bond to retroreflective elements and inorganic anti-skid particles, and typically do not discolor with exposure to ultraviolet radiation. The binder layer and/or the top film may include light transmissible colorants to impart a desired color to the inventive article. For example, a yellow colorant may be added to the binder layer 216 to yield a yellow colored retroreflective sheet.

The inventive article may further comprise an optional adhesive layer (not shown) adhered to the bottom side of the conformance layer that provides a mechanism for attaching the retroreflective article to a surface, e.g., a roadway. If, however, no conformance layer is used, then the adhesive layer 224 would provide for direct attachment to a roadway surface. If desired, a layer of adhesive or primer may be applied to the roadway surface prior to laminating the retroreflective article. The criteria for suitable adhesive materials and primers will be dependent in part upon the nature of the sheeting and the intended application; suitable materials can be readily selected by those skilled in the art.

Advantageously, the retroreflective elements also function as skid control particles, sometimes referred to as anti-skid particles, on the upper surface of the retroreflective sheet. Thus, in accordance with the present invention, it is not necessary to use conventional skid-control particles to improve the traction of vehicles passing thereover.

Also, a thin, high abrasion resistance and/or dirt resistance coating (also referred to herein as a "protective coating") may be applied to the top surface of the retroreflective article to protect it from traffic wear and dirt accumulation. Preferably, the protective coating will be light transmissible and will not reduce the skid resistance of the article.

Typically, retroreflective articles of the invention can be wound into roll form. In such instances, it may be desirable to use a release liner or apply a release treatment, e.g., silicone, to the top surface of the marking.

Retroreflective sheetings used in the invention preferably possess good angularity; that is, the sheets' retroreflectivity is still substantial at relatively high entrance angles of about 80° or more, preferably 85° or more. In accordance with the present invention, the retroreflective sheet preferably adhere together in all types of weather conditions, even under repeated impact and shear stress resulting from road traffic passing over the sheeting in the case of pavement marking applications.

Optionally, the backing materials of the article may include conformance layers that can be in the form of a scrim layer, a foil, or polymeric premix layers. Conformance layers are commonly used to impart a variety of features to the article including, but not limited to, flexibility, integrity, removability, and increased tear resistance. Suitable embodiments can be readily selected by those skilled in the art. As shown in FIG. 1, a retroreflective article 200 includes a conformance layer 230 attached to the retroreflective article by the adhesive layer 224.

As mentioned above, the inventive article includes a retroreflective sheeting. There are essentially two types of retroreflective sheeting: microsphere-based sheeting (also referred to as "beaded sheeting") and cube-corner based sheeting. The retroreflective sheeting has a first surface and a second surface, the first surface being the one that is capable of retroreflecting incident light. In general, a beaded sheeting typically includes a multitude of independent beads (i.e., microspheres), either glass or ceramic, that are at least partially embedded in a binder layer and are associated with specular or diffuse reflecting materials (e.g., pigment particles, metal flakes, or metal vapor coats) to retroreflect incident light. In general, a cube-corner retroreflective sheeting typically includes an array of cube-corner elements acting as optical elements. In summary, the basic cube-corner element is a tetrahedral structure with a base triangle (commonly referred to as the "base plane") and three mutually substantially perpendicular optical faces that cooperate to retroreflect incident light. Typically, these optical faces intersect at an apex, and the base plane lies opposite the apex. In operation, light incident on a base plane is transmitted into the cube-corner element, is reflected from each of the three optical faces, and is redirected back in the direction it came. Any retroreflective sheeting possessing good retroreflective performance at high entrance angles (typically about 80° or more, preferably 85° or more) are suitable for use in accordance with the present invention.

Both beaded and cube-corner sheetings can be assembled in a variety of ways. In general, there are two different class of sheeting assembly: exposed-lens sheeting and enclosed-lens sheeting, the latter useful in the practice of this invention. The term "lens" covers beads and cube-corner as optical elements. In general, there are two types of enclosed-lens sheeting: embedded-lens sheeting and encapsulated-lens sheeting. Thus, there are at least four combinations of sheeting useful in the practice of this invention: (1) embedded-lens beaded sheeting, (2) encapsulated-lens beaded sheeting, (3) embedded-lens cube-corner sheeting, and (4) encapsulated-lens cube-corner sheeting. These four types of sheetings are discussed in detail below.

An embedded-lens beaded sheeting typically includes a layer of transparent microspheres (usually glass beads) where the front and the rear surfaces of the microspheres are embedded in a transparent binder and a reflective layer disposed from the rear surface of each of the microspheres by a selected distance. U.S. Pat. No. 4,505,967 (Bailey) discloses an embedded-lens beaded sheeting construction that is particularly well suited for the practice of this invention. Commercially available sheeting include those under the trade designation SCOTCHLITE Reflective License Plate Sheeting, Series 3570, 3750, and 3770 (all from Minnesota Mining and Manufacturing (3M) Company, St. Paul, Minn.).

An encapsulated-lens beaded sheeting typically includes a layer of transparent microspheres (usually glass beads) partially embedded in a binder layer with a reflective layer on the rear (i.e., embedded) portions thereof. The front portions of the microspheres are not embedded. A top film disposed in front of the microspheres provides an air interface. A portion of the top film is bonded to a portion of the binder layer in selected areas to form individual cells. Each cell has an internal air gap creating an internal void. As used herein, the term "top film" refers to any layer that is in front of the microspheres. Preferably, a reflective layer is disposed from the rear surfaces of the microspheres by a selected distance.

An embedded-lens cube-corner sheeting typically includes a layer of cube-corner elements whose optical faces contain a reflective layer and embedded in a polymeric matrix, typically an adhesive layer. Commonly used reflective layers include aluminum and silver.

An encapsulated-lens cube-corner sheeting typically includes a layer of cube-corner elements and a sealing layer, a portion of which is bonded to the optical faces of the cube-corner elements or to the overlay, thereby forming individual cells. U.S. Pat. No. 5,450,235 (Smith et al.) and U.S. Pat. No. 5,691,846 (Benson Jr., et al.) disclose useful cube-corner sheeting for the practice of this invention. Each cell has an internal air gap between the cube-corner optical faces and the sealing film. A preferred cube-corner encapsulated-lens sheeting is commercially available under the trade designation SCOTCHLITE DIAMOND GRADE Conspicuity Sheeting Series 983, from 3M Company, St. Paul, Minn. This particular sheeting includes alternating zones of cube-corner element arrays disposed at approximately ninety degrees orientation to provide two principle planes of improved retroreflective performance in response to light incident on the sheeting at relatively high entrance angles, as described in U.S. Pat. No. 5,706,132 (Nestegard et al.).

Embedded-lens retroreflective sheetings are typically more preferred than encapsulated-lens retroreflective sheetings when used as pavement markings. It is believed that the solid construction of the embedded-lens sheeting would be more durable when subjected to traffic conditions because it has no internal voids like encapsulated-lens sheeting. Embedded-lens sheetings are available in commercial forms that are quite durable and flexible.

Enclosed-lens beaded optical systems use the light bending and focusing effect of the microspheres to refract light onto a reflector member, which is reflected and then refracted back toward its origin. The degree of refraction and thus the optimal placement of the specular reflector depends on the relative refractive indices of the top film and binder layers above the microspheres, the microspheres, and the spacing layer between the microspheres and the reflector member, if any. For example, when used with top films and spacing layer materials having refractive index of approximately 1.5, a 2.25 refractive index microsphere will focus the light behind it at a distance of about 0.44 times its radius. The thickness of the spacing layer preferably approximates this so that light is focused onto the specular reflector. Any deviation away from these precise optical relationships will tend to result in losses of retroreflectivity of the base sheeting. Thus, the top film preferably remains firmly attached to the microsphere layer, the microspheres preferably are positioned in a stable fashion in the polymer matrix, and all layers through which light must pass to be retroreflected are preferably clear and distortion-free. In addition, the reflective layer, typically vapor deposited aluminum or silver, preferably remains as a substantially continuous, distortion-free layer without cracking or corroding. The spacing layer-specular layer interface preferably remains smooth and wrinkle-free. Very small changes in these optical relationships will tend to result in degradation of the retroreflective performance of the sheeting and thus of any article made using such sheeting. Although extremely small changes may not cause objectionable brightness loss, slight changes can severely affect these precise relationships. It is surprising that any retroreflective sheeting made using these precise optical relationships can withstand repeated traffic impact and shear stresses in combination with other effects of sunlight, rain, road oil, road sand, road salt, and vehicle emissions.

When light enters embedded-lens beaded sheeting at high entrance angles and passes through a microsphere, it tends to be focused at the side of the microsphere rather than at the back as happens when light is incident in a more perpendicular fashion at low incidence angles. Therefore, it is important to maintain the right spacing between the microspheres and reflective layer. As will be understood by those skilled in the art, the thickness of the space coat layer can be controlled partly by fabrication methods. When the spacing layer tends to conform hemispherically, that is, concentricly to the back side of the microspheres, optimum spacing for a variety of entrance angles can be achieved.

Table 1 below shows the brightness measurements of various types of retroreflective sheetings under both dry and dynamic wet conditions. The measurements were performed according to ASTM 4061-94 and as described in the "Dry/Wet Retroreflectivity Measurements" section of the Examples. The measurements were taken at a simulated 30 meter viewing geometry, meaning that the observation angle was at 1.05°, the $\beta_1$ entrance angle was at 88.76°, the $\beta_2$ entrance angle was at 0°, and the rotation angle was at 0°. None of the sheetings evaluated had retroreflective elements at least partially embedded in a bonding layer.

TABLE 1

Retroreflective Performance of Various Sheetings at a Simulated 30 Meter Viewing Geometry under Dry and Dynamic Wet Conditions

| Sheeting Designation | Reflective Sheeting Type | Dry $R_L$, (mcd/m²)/lx | Wet $R_L$, (mcd/m²)/lx |
|---|---|---|---|
| Sample 1 SCOTCHLITE DIAMOND GRADE CONSPICUITY SHEETING SERIES 980* | Encapsulated-lens, cube-corner | 11 | 40 |
| Sample 2 SCOTCHLITE DIAMOND GRADE CONSPICUITY SHEETING SERIES 983* | Encapsulated-lens, cube-corner | 59 | 507 |
| Sample 3 Tiled Cube-corner sheeting with optical faces having a reflective layer thereon | Embedded-lens, cube-corner | 105 | 804 |
| Sample 4 SCOTCHLITE HIGH INTENSITY GRADE REFLECTIVE SHEETING SERIES 3870* | Encapsulated-lens, beaded | 11 | 309 |
| Sample 5 SCOTCHLITE ENGINEER GRADE REFLECTIVE SHEETING SERIES 3290-I* | Embedded-lens, beaded | 13 | 53 |
| Sample 6 SCOTCHLITE PRECLEAR REFLECTIVE LICENSE PLATE SHEETING SERIES 4770* | Embedded-lens, beaded | 51 | 1547 |
| Sample 7 SCOTCHLITE REFLECTIVE LICENSE PLATE SHEETING SERIES 3750*, plus a 2 mil polyurethane bonding layer on the front surface of the sheeting | Embedded-lens, beaded | 62 | 1980 |

*Commercially available from Minnesota Mining and Manufacturing Company, St. Paul, MN.

Table 1 indicates that all sheetings showed an increase in retroreflective performance under dynamic wet conditions. The sheetings, however, have rather low retroreflective performance under dry conditions. To be useful in the present invention, the sheeting preferably has (i) a minimum $R_L$ value of about 40 (mcd/m²)/lux under dry conditions and (ii) increases in $R_L$ when exposed to dynamic wet conditions, increasing to about 100 (mcd/m²)/lux, preferably increasing to about 300 (mcd/m²)/lux. Samples 2, 3, 6, and 7 meet these two conditions and are preferred sheetings for the practice of this invention. The retroreflective elements, as described in further detail below, provide retroreflective performance under dry conditions. Thus, a combination of the preferred sheeting and retroreflective elements yields an article exhibiting good retroreflective performance under dry and dynamic wet conditions.

While not wishing to be bound by any particular theory, it is believed that the water forms a refracting layer, either as hemispherical droplets or prismatic wave structures, that bend the incident light to the retroreflective sheeting lying beneath.

This bending effect occurs regardless of the retroreflective sheeting type. The bent light rays are capable of being directed back to the light source. Thus, under dynamic wet conditions, an increase of retroreflectivity was observed for all sheetings tested above. Further, it is believed that due to the low refracting power of the water layer, design of the retroreflective sheeting must be of an extreme wide-angle performance type (i.e., high angularity sheeting) to achieve useful visibility levels as a horizontal pavement marking.

In accordance with present invention, a retroreflective article includes a plurality of retroreflective elements at least partially embedded in a bonding layer disposed on a surface of a retroreflective sheeting, on the front surface that is capable of retroreflecting incident light. Preferably, each retroreflective element includes a core having optical elements (such as microspheres) at least partially embedded therein. The retroreflective elements are an exposed-lens beaded system, meaning that a portion of the optical elements are exposed to ambient conditions. Optionally, the core, the optical elements, or both, may contain a conventional pigment to impart a color to the elements, such as yellow, white, blue, and the like. Suitable retroreflective elements are described in U.S. Pat. No. 3,043,196 (Palmquist et al.); U.S. Pat. No. 3,274,888 (Vanstrum et al.); U.S. Pat. No. 3,418,896 (Rideout); and U.S. Pat. Nos. 5,750,191 and 5,571,362 (both to Hachey et al.). Suitable retroreflective elements can have a variety of shapes, including regular shapes such as substantially spherical, substantially cubical, as well as irregular shapes, and a combination thereof.

U.S. Pat. No. 5,774,265 (Mathers et al.) describes a preferred retroreflective element useful for the practice of the present invention. Preferably, the retroreflective elements are all-ceramic having an opacified ceramic core and ceramic optical elements partially embedded into the core. The core material preferably has a relatively high degree of light scattering. More preferably, the core material contains a glass phase and a crystalline phase, collectively known as opacified glasses. Preferably, the core includes at least two phases, one phase in a size range from about 0.5 micrometers to about 1.0 micrometers, wherein one phase has a refractive index value of at least 0.4 greater than the second. More preferably, the opacified glass core includes an opacifier having a refractive index of about 1.9 to about 2.7. Opacifiers are materials used as a scattering phase. They have a high refractive index ($N_D$) and are used with opacified glass. Suitable opacifiers include, for example, tin oxide ($SnO_2$) having a $N_D$ of about 2.04; calcium titanate ($CaTiO_3$) having a $N_D$ of about 2.35; titania anatase and rutile, having a $N_D$ of about 2.5 to about 2.7; and zircon ($ZrSiO_4$) having a $N_D$ of about 1.9 to about 2.05. Particularly preferred retroreflective elements are preferably light transmissible (that may be pigmented) and light transmissible optical elements (that may be pigmented) embedded in the core. Preferably, these retroreflective elements are substantially spherical.

Preferably, a retroreflective article in accordance with the present invention includes a plurality of substantially spherical retroreflective elements having an average diameter of about 0.5 mm to about 1.2 mm, although other sizes can be used in the present invention. The retroreflective elements preferably have an average density of about 3.5 grams per cubic centimeter (g/cc), although elements having densities less than or greater than 3.5 g/cc can be used in a retroreflective article in accordance with the present invention. The retroreflective elements are present in retroreflective article in an amount sufficient to impart the desired dry and wet retroreflective performance and skid-resistance. Preferably, the amount of retroreflective elements in an article according to the present invention covers less than 120% of a surface area of the article, preferably about 0.4% to about 6.6%, more preferably, about 0.8% to about 3.3%.

As mentioned above, the retroreflective elements are bonded to the retroreflective sheeting by a bonding layer. The bonding layer lies on or in close proximity to the front or retroreflective surface of retroreflective sheeting and is preferably light transmissible. Preferably, the bonding layer is formed from a bonding composition, such as a polymer composition, suitable examples of which are ceramer compositions and polyurethane compositions.

Suitable polyurethane compositions can be solvent-based or water based (i.e., substantially solvent-free). Polyurethane compositions are preferred because they generally possess suitable adhesion to the retroreflective elements that are at least partially embedded therein. Aliphatic polyurethanes are preferred because they adhere strongly to the retroreflective sheeting and are suitably resistant to environmental weathering, including dirt build-up and discoloration due to ultraviolet radiation exposure.

Although any of a number of water based polyurethane compositions can be used in the present invention, one illustrative example includes a water-based urethane resin and a crosslinker commercially available under the trade designations NEOREZ R-960 and NEOCRYL CX 100, respectively, both from Zeneca Resins Company, Wilmington, Mass.

One illustrative example of a solvent-based polyurethane composition suitable for use in the present invention includes (i) a polyol mixture, (ii) a polyisocyanate, and (iii) a catalyst.

The polyol mixture typically includes reactive hydroxyl groups dispersed in a solvent. Suitable solvents include acetone, xylene, methylisobutyl-ketone, glycol ether acetates, methylethylketone, and combinations thereof. The solvent preferably makes up about 20 weight percent of the polyol mixture. A suitable polyol can be selected from the group of polycaprolactone triols and unsaturated polyester diols, for example. The polyol mixture can include a blend of polycaprolactone triols, many of which are commercially available. Preferably, the polycaprolactone triol blend has an average molecular weight from about 300 to about 600, an average hydroxyl equivalent weight from about 100 to about 220, and an average of about 3 hydroxyl groups per polyol. For example, a blend may include a polycaprolactone triol having a molecular weight of about 300 (available under the trade designation TONE 301, from Union Carbide Company, Danbury, Conn.) and a polycaprolactone triol having a molecular weight of about 960 (available under the trade designation TONE 310, from Union Carbide Company, Danbury, Conn.). It is believed that the lower molecular weight triol imparts rigidity to the polyurethane while the higher molecular weight triol is included to lower the elastic modulus. A blend may also include a triol and a diol, such as that described in U.S. Pat. No. 5,127,973 (Sengupta et al.).

As mentioned above, the polyurethane composition also includes an isocyananate that provides reactive NCO groups. Useful isocyanates include isophorone diisocyanate; 4,4'-methylene-bis-cyclohexyl diisocyanate; tetramethylene diisocyanate; 1,3- and 1,4-cyclohexyl diisocyanate; 1,6 hexamethylene diisocyanate; and isomers of tetramethylxylene diisocyanate. One useful isocyanate is polyisocyanate that is an adduct of 1,6 hexamethylene diisocyanate, such as that commercially available under the trade designation DESMODUR N-100, from Bayer Company, Pittsburgh, Pa.

A preferred polyurethane composition includes an equivalent ratio of NCO groups of the isocyanate to the hydroxyl groups of the polyol mixture greater than about 1.05:1. As mentioned above, a catalyst is typically included in the polyurethane composition to initiate reaction of the polyol with the isocyanate components. Such catalysts are known by those skilled in the art. One preferred catalyst is dibutyl tin dilaurate.

A bonding layer may also include at least one optional additive. For example, because a retroreflective article in accordance with the present invention is typically exposed to sunlight during use, the bonding layer may also include ultraviolet light absorbers. The bonding layer may also include fungicides, light transmissible colorants, to name a few. Illustrative examples of desirable colorants include, among others, white, yellow, red, and blue colors, and any others so long as it is light transmissible. While not wishing to be bound by any particular theory, it is believed that light transmissible colorants may enhance both daytime and nighttime color of the inventive article. In pavement marking applications, as well as others, it is important that a motorist distinguish between colored markers, for example between yellow and white markings. One way to obtain night time color involves placing a light transmissible colored material in the optical path.

Preferably, the bonding layer has a dry coating thickness of about 0.025 mm to about 0.13 mm (about 0.001 inch to about 0.005 inch). More preferably, the bonding layer has a dry coating thickness of about 0.075 mm (about 0.003 inch) to provide sufficient resistance to abrasion and dirt as well as to adequately bond the retroreflective elements to the retroreflective sheeting.

One method of the invention comprises: (a) providing a retroreflective sheeting having a first surface and a second surface; (b) applying a bonding composition to the first surface of the retroreflective sheeting, wherein the bonding composition is capable of forming a light transmissible bonding layer; and (c) applying a plurality of retroreflective elements to the bonding composition so that the retroreflective elements are partially embedded in the bonding layer. The bonding layer applied to the retroreflective sheeting is typically accomplished by coating a bonding composition on the first surface, i.e., the surface capable of reflecting incident light, of the retroreflective sheeting using a conventional technique such as notch bar coating, spray coating, gravure coating, knife coating, and the like.

A retroreflective article of the invention may also include a protective coating (not shown in FIG. 1). Such a layer has the advantages of providing abrasion and/or dirt resistance. Illustrative examples of a protective coating include, but are not limited to, ceramer compositions (as disclosed in U.S. Pat. No. 5,677,050 (Bilkadi et al.)) or crosslinked polyurethane compositions, including those discussed above with respect to the bonding layer. Additionally, an inventive article can be made with a light transmissible yellow, red, or blue colored top film (not shown in FIG. 1). Typically, the top film is positioned on the retroreflective sheeting's first surface either next to such a surface and or next to the bonding layer. Alternatively, a light transmissible colored layer can be applied onto the retroreflective sheet using conventional methods. Subsequently, a colorless top film could be applied to the colored retroreflective sheet.

Typically, retroreflective elements can be randomly sprinkled on to the bonding layer (or protective coating, or top film, if present) of the retroreflective sheet while it is in a softened state. For example, a web of retroreflective sheeting could be coated with a bonding composition. While the bonding composition remains softened or "wet," a suitable amount of retroreflective elements can be sprinkled on to the web. Subsequently, the web is sent through a series of ovens to dry, cure, or solidify the wet binder composition. As a result, the retroreflective elements are secured to the front surface of the retroreflective article thereby providing retroreflective and anti-skid performance.

Retroreflective articles of the present invention may be used advantageously in a number of different applications, particularly in wet conditions and where light is incident at high entrance angles. The articles are well suited for use as pavement markings. Because of their high retroreflectivity at both high and low entrance angles, the articles are also well-suited for vertical applications, such as use on jersey barricades or guard rails; for curved surfaces applications such as traffic barrels, tubes, and cones; for vehicle surfaces; and for other applications where the exceptional effective entrance angularity of the article will be advantageous. For example, many embodiments of sheeting of the invention can provide effective retroreflection over all entrance angles from 0° to nearly 90°. As a result, when the sheeting is wrapped around an object such as a telephone pole or barrel, the entire surface of the sheeting that is within the line of sight can provide effective retroreflection including portions on the surface of the article that are curving away from the observer. This increases the effective retroreflective area, providing a more visible marking and thereby enhancing safety. In addition, a single marking such as a stripe on a guard rail, jersey barrier, or wall that is parallel a first road and perpendicular to a second road that intersects the first road on the opposite side of the first road from the second road can provide very bright and effective retroreflective response visible to drivers of vehicles on both the first and second roads.

Another advantage of the present invention is that the retroreflective article is visible from any direction, as the reflectivity is high regardless of the direction of approach of the viewer to the article. This omni-directional feature makes the invention particularly well suited for horizontal applications, such as intersection markings, where vehicles may approach from a number of angles.

A retroreflective article of the invention may be wound upon itself into a roll form. The projections made by the retroreflective elements are not substantial enough to interfere with wind-up of the article.

EXAMPLES

The invention will be further explained by the following illustrative examples that are intended to be non-limiting.

Retroreflectivity Measurements Under Dry and Dynamic Wet Conditions

Dry and wet coefficients of Retroreflected Luminance ($R_L$) were measured for Examples 1–9 and Comparative Example A in accordance with ASTM E809 entitled Standard Practice for measuring Photometric Characteristics of Retroreflectors and ASTM D 4061-94 entitled Test Method for Retroreflectance of Horizontal Coatings.

In each case, the reflective articles to be evaluated were applied to flat aluminum panels and placed on a horizontal surface, to simulate a pavement marking applied to a road surface. $R_L$ was measured under dry and wet conditions at a simulated viewing distance of 30 meters. A Gamma Scientific Photometer Model 2009 (formerly Gamma Scientific now Advanced Retro Technology, Inc. Spring Valley, Calif.) with a Gamma Scientific Model RS-50 lamp was used to make the measurements. The observation angle was 1.05°, the $\beta_1$ entrance angle was 88.76°, the $\beta_2$ entrance angle was 0°, and unless specified the rotation angle was 0°. $R_L$ of the samples were first measured in a dry condition.

Then the panels were subjected to simulated rainfall at the rate of 15 cm/hour (6 inches/hour). During the simulated rainfall, $R_L$ was continuously measured and a value recorded when a steady state was achieved. In general, steady state occurred when the readings on the photometer deviated only slightly and uniformly around a mean value for each measurement taken. Typically, the time to reach steady state was from 1 to 2 minutes after measurement with the photometer was begun.

Skid-Resistance

A required property for a pavement marking material is skid resistance. Each of the retroreflective articles prepared as described below was tested using a British Portable Skid Tester in accordance with ASTM E303 (which measures skid resistance in units of British Portable Number or BPN).

Examples 1–9

Retroreflective article was made in accordance with the present invention as follows. Unless stated otherwise all percentages and parts are by weight.

The solvent-based aliphatic polyurethane bonding composition was formulated as follows. About 1.6 parts DESMODUR N100 isocyanate resin (available from Bayer Corporation, Pittsburgh, Pa.) was mixed with about 1.0 part polyol. The polyol was made by mixing (i) about 79% polycaprolactone triol (commercially available as Tone® 301 from Union Carbide Company, Danbury, Conn.), (ii) about 7% polyester polyol (commercially available as Lexorez® 1405–65 from Inolex Chemical Co., Philadelphia, Pa. or Adhesion Resin LTH from HULS America, Inc., Piscataway, N.J.), (iii) about 13% acetone, (iv) about 1% xylene, and (v) about less than 1% polysiloxane.

The bonding composition was notch bar coated on the front surface, i.e., the surface capable of retroreflecting incident light, of an embedded-lens beaded retroreflective sheeting commercially available as Scotchlite™ Reflective License Plate Sheeting Series 3750 to yield a dry thickness of about 0.05 millimeter (0.002 inch).

Retroreflective elements, as described in U.S. Pat. No. 5,774,265 (Mathers et al.), were sprinkled on to the bonding composition while it was still wet, tacky, or in a softened state. The retroreflective elements had a titania opacified glass core and the optical element portion was comprised of 1.9 refractive index ceramic beads as described in U.S. Pat. No. 4,564,556 (Lange) and having a diameter of about 165 micrometers. Prior to application to the bonding composition. the retroreflective elements were sized with standard sieves collecting those passing through a 16 US Mesh (1.2 mm opening) and retained by 35 US Mesh (about 0.5 mm opening).

Examples 1–9 were prepared sprinkling various amounts of retroreflective elements to the bonding composition. Once the retroreflective elements were applied to the bonding composition, each sample was cured and dried in an oven at a temperature of about 260° F. (127° C.) for about 20 minutes.

TABLE 2 illustrates the amount of retroreflective element used in the various samples, along with the approximately surface area coverage of those elements. Skid resistance values, as measured by ASTM E303, are also reported. It should be noted that Comparative Example A represented the retroreflective sheeting with no retroreflective elements on the top surface of it, and corresponds to Sample 7 of TABLE 1.

TABLE 2

Amount of Retroreflective Elements Used and Corresponding Skid Resistance Performance

| Example | Retroreflective elements (g/m$^2$) | Percent Surface Area covered by elements | Skid resistance (BPN) |
|---|---|---|---|
| Comparative Example A Scotchlite ™ Reflective License Plate Sheeting Series 3750, plus a 2 mil bonding layer on the front surface | 0 | 0 | 17 |
| Example 1 | 8 | 0.4 | 50 |
| Example 2 | 17 | 0.8 | 64 |
| Example 3 | 34 | 1.7 | 72 |
| Example 4 | 67 | 3.3 | 87 |
| Example 5 | 134 | 6.6 | 87 |
| Example 6 | 268 | 13.3 | 84 |
| Example 7 | 402 | 19.9 | 80 |
| Example 8 | 536 | 26.6 | 80 |
| Example 9 | 1026 | 50.9 | 74 |

Preferably, a minimum value of about 45 BPN to about 55 BPN is suitable for pavement marking applications. The data above illustrates an increase in BPN as the percent surface area of the article covered by the retroreflective elements is increased until an optimum is reached. A maximum value of about 64 BPN to about 90 BPN is typically suitable for pavement markings because it is known to provide sufficient skid resistance. It was observed that skid resistance actually decreased slightly with higher amounts of retroreflective elements, for example, when more than about 6.6% of the surface area was coated with retroreflective elements.

TABLE 3

Retroreflectivity of Samples Under Dry and Dynamic Wet Conditions Measured According to ASTM E-809 and ASTM D 4061-94

| Example | Dry R$_L$ (mcd/m$^2$)/lx | Wet R$_L$ (mcd/m$^2$)/lx |
|---|---|---|
| Comparative Example A | 58 | 1361 |
| Example 1 | 656 | 1609 |
| Example 2 | 1176 | 1547 |
| Example 3 | 1621 | 1361 |
| Example 4 | 1794 | 1207 |
| Example 5 | 2098 | 928 |
| Example 6 | 1980 | 340 |
| Example 7 | 1906 | 278 |
| Example 8 | 1852 | 268 |
| Example 9 | 1577 | 33 |

The data demonstrated that a useful pavement marking can be made by combining dry and wet retroreflective systems so long as the surface area used by each system allows adequate visibility. An apparent decrease in wet retroreflectivity as the amount of retroreflective elements covered more than about 3.3% of the surface area was observed. While not wishing to be bound by any particular theory, it is believed that as the amount of retroreflective elements increase above an optimum amount, they block out a substantial amount of the retroreflective sheeting underneath. As TABLE 1 shows, the sheeting contributes strongly to retroreflectivity under dynamic wet conditions. Thus, there is an optimum amount of retroreflective elements when used in combination with retroreflective sheeting to provide optimum retroreflective performance under dry and dynamic wet conditions.

Patents, patent applications and documents disclosed herein are hereby incorporated by reference as if individually incorporated. It is to be understood that the above description is intended to be illustrative, and not restrictive. Various modifications and alterations of this invention will become apparent to those skilled in the art from the foregoing description without departing from the scope and the spirit of this invention, and it should be understood that this invention is not to be unduly limited to the illustrative embodiments set forth herein.

What is claimed is:

1. A retroreflective article comprising:
   a first retroreflective system including an enclosed-lens retroreflective sheeting having a first surface and a second surface, wherein under dry conditions the sheeting exhibits a coefficient of retroreflective luminance at a simulated 30 meter viewing geometry as measured by ASTM D 4061-94 of about 40 (millicandela/m$^2$)/lux and under dynamic wet conditions, the sheeting exhibits an increase in coefficient of retroreflective luminance;
   a light transmissible bonding layer disposed on the first surface of the retroreflective sheeting; and
   a second retroreflective system including a plurality of retroreflective elements partially embedded in the bonding layer, wherein the first retroreflective system operates independently from the second retroreflective system.

2. The article of claim 1 wherein the enclosed-lens retroreflective sheeting is selected from the group consisting embedded-lens beaded sheeting, encapsulated-lens beaded sheeting, embedded-lens cube-corner sheeting, encapsulated-lens cube-corner sheeting, and combinations thereof.

3. The article of claim 2 further comprising a light transmissible colorant in at least one component selected from the group consisting of optical elements of the retroreflective elements, bonding layer, binder layer of the beaded embedded-lens retroreflective sheet, and space layer of the beaded embedded-lens retroreflective sheet.

4. The article of claim 2 wherein the embedded-lens beaded sheeting comprises a layer of microspheres embedded therein, the microspheres having an average diameter of about 30 micrometers to about 850 micrometers.

5. The article of claim 4 wherein the microspheres have a refractive index of about 1.50 to about 2.60.

6. The article of claim 1 wherein the retroreflective elements are substantially spherical in shape.

7. The article of claim 6 wherein the retroreflective elements have an average diameter from about 0.5 mm to about 1.2 mm.

8. The article of claim 7 wherein the retroreflective elements cover from about 0.1 percent to about 7 percent of a surface area of the retroreflective sheeting.

9. The article of claim 1 wherein the retroreflective elements comprise ceramic optical elements partially embedded in an opacified glass core.

10. The article of claim 9 wherein the ceramic optical elements comprise an amorphous phase, a crystalline phase, and a combination thereof.

11. The article of claim 9 wherein the core comprises at least two phases, one phase in a size range from about 0.05 micrometers to about 1.0 micrometers.

12. The article of claim 9 wherein the core comprises at least two phases, wherein one phase has a refractive index value of at least 0.4 greater than the second phase.

13. The article of claim 9 wherein the opacified glass comprises an opacifier having a refractive index of about 1.9 to about 2.7.

14. The article of claim 13 wherein the opacifier is selected from the group consisting of $TiO_2$ (anatase), $TiO_2$ (rutile), and $ZrSiO_4$.

15. The article of claim 1 further comprising at least one of a conformance layer, a scrim layer, and an adhesive layer on the second surface of the retroreflective sheeting.

16. The article of claim 1 wherein the light transmissible bonding layer is formed from a solvent-based polyurethane composition.

17. The article of claim 1 further comprising a light transmissible top film disposed on a surface of the bonding layer.

18. The article of claim 1 exhibiting skid resistance of about 45 to about 90 BPN as measured by ASTM E303.

19. The retroreflective article of claim 1 wherein the sheeting increases in coefficient of retroreflective luminance to about 100 $(mcd/m^2)$/lux under dynamic wet condition.

20. A roadway surface marked with an article of claim 1.

21. A method for making a retroreflective article comprising:
provided a first retroreflective system including retroreflective sheeting comprising a first surface and a second surface;
applying a bonding composition to the first surface of the retroreflective sheeting, wherein the bonding composition is capable of forming a light transmissible bonding layer; and
applying a second retroreflective system, wherein the first retroreflective system operates independently from the second retroreflective system, the second retroreflective system including a plurality of retroreflective elements to the bonding composition so that the retroreflective elements are partially embedded in the bonding layer.

22. The article of claim 1 wherein the retroreflective elements include retroreflecting complexes surrounding a core.

23. The article of claim 22 wherein the retroreflecting complexes includes beads.

24. The article of claim 22 wherein the core is opaque.

25. A retroreflective article comprising:
an enclosed-lens retroreflective sheeting having a first surface and a second surface, wherein under dry conditions the sheeting exhibits a coefficient of retroreflective luminance at a simulated 30 meter viewing geometry as measured by ASTM D 4061-94 of about 40 $(millicandela/m^2)$/lux and under dynamic wet conditions, the sheeting exhibits an increase in coefficient of retroreflective luminance;
a light transmissible bonding layer disposed on the first surface of the retroreflective sheeting; and
a plurality of retroreflective elements partially embedded in the bonding layer, wherein the retroreflective elements comprise ceramic optical elements partially embedded in an opacified glass core.

26. The article of claim 25 wherein the ceramic optical elements comprise an amorphous phase, a crystalline phase, and a combination thereof.

27. The article of claim 25 wherein the core comprises at least two phases, one phase in a size range from about 0.05 micrometers to about 1.0 micrometers.

28. The article of claim 25 wherein the core comprises at least two phases, wherein one phase has a refractive index value of at least 0.4 greater than the second phase.

29. The article of claim 25 wherein the opacified glass comprises an opacifier having a refractive index of about 1.9 to about 2.7.

30. The article of claim 29 wherein the opacifier is selected from the group consisting of $TiO_2$ (anatase), $TiO_2$ (rutile), and $ZrSiO_4$.

31. A retroreflective article comprising:
an enclosed-lens retroreflective sheeting having a first surface and a second surface, wherein under dry conditions the sheeting exhibits a coefficient of retroreflective luminance at a simulated 30 meter viewing geometry as measured by ASTM D 4061-94 of about 40 $(millicandela/m^2)$/lux and under dynamic wet conditions, the sheeting exhibits an increase in coefficient of retroreflective luminance;
a light transmissible bonding layer disposed on the first surface of the retroreflective sheeting; and
a plurality of retroreflective elements partially embedded in the bonding layer, wherein the retroreflective elements include retroreflecting complexes surrounding a core.

32. The article of claim 31 wherein the retroreflecting complexes includes beads.

33. The article of claim 31 wherein the core is opaque.

* * * * *